(12) United States Patent
Ueki et al.

(10) Patent No.: US 9,922,794 B2
(45) Date of Patent: Mar. 20, 2018

(54) ROTATING ANODE X-RAY TUBE

(71) Applicant: Toshiba Electron Tubes & Devices Co., Ltd., Otawara-shi (JP)

(72) Inventors: Masataka Ueki, Nasushiobara (JP); Yasutaka Ito, Kawasaki (JP)

(73) Assignee: Toshiba Electron Tubes & Devices Co., Ltd., Otawara-shi (JP)

( * ) Notice: Subject to any disclaimer, the term of this patent is extended or adjusted under 35 U.S.C. 154(b) by 277 days.

(21) Appl. No.: 14/190,328

(22) Filed: Feb. 26, 2014

(65) Prior Publication Data

US 2014/0247922 A1   Sep. 4, 2014

(30) Foreign Application Priority Data

Mar. 4, 2013   (JP) .................................. 2013-042010

(51) Int. Cl.
```
H01J 35/10      (2006.01)
F16C 17/02      (2006.01)
F16C 17/10      (2006.01)
```
(52) U.S. Cl.
CPC .......... *H01J 35/101* (2013.01); *F16C 17/026* (2013.01); *F16C 17/102* (2013.01); *H01J 35/106* (2013.01); *H01J 2235/1053* (2013.01); *H01J 2235/1086* (2013.01)

(58) Field of Classification Search
CPC ........ H01J 35/10; F16C 17/026; F16C 33/107
USPC ....................................................... 378/132
See application file for complete search history.

(56) References Cited

U.S. PATENT DOCUMENTS

| | | | | |
|---|---|---|---|---|
| 6,467,962 | B1* | 10/2002 | Suzuki | B21J 5/12 29/898.02 |
| 6,502,989 | B1* | 1/2003 | Takeuchi | F16C 17/026 384/100 |
| 7,988,361 | B1* | 8/2011 | Mori | F16C 33/102 384/114 |
| 2001/0055365 | A1* | 12/2001 | Yasutake | H01J 35/101 378/144 |
| 2002/0075998 | A1* | 6/2002 | Yoshida | F16C 17/102 378/133 |

(Continued)

FOREIGN PATENT DOCUMENTS

| | | |
|---|---|---|
| JP | 2002-75259 | 3/2002 |
| JP | 2002-75260 | 3/2002 |

(Continued)

OTHER PUBLICATIONS

Japanese Office Action dated May 31, 2016 in Japanese Patent Application No. 2013-042010 with English translation, 7 pages.

*Primary Examiner* — Jason McCormack
*Assistant Examiner* — James Choi
(74) *Attorney, Agent, or Firm* — Oblon, McClelland, Maier & Neustadt, L.L.P.

(57) ABSTRACT

According to one embodiment, a rotating anode X-ray tube includes a fixed shaft, a rotor, a lubricant, target, and a supporting member. The fixed shaft includes a small-diameter portion provided with a first radial bearing surface including first grooved surfaces, and a large-diameter portion provided with a second radial bearing surface including second grooved surfaces. The rotor includes a third radial bearing surface. The lubricant is filled in a gap between the fixed shaft and the rotor, and drawn by the first and second grooved surfaces.

8 Claims, 1 Drawing Sheet

(56) References Cited

U.S. PATENT DOCUMENTS

2006/0140521 A1* 6/2006 Uenosono ............. F16C 17/026
                                                        384/100
2006/0193439 A1* 8/2006 Anno ................... F16C 37/002
                                                        378/130
2017/0102031 A1* 4/2017 Potze ................... F16C 17/026

FOREIGN PATENT DOCUMENTS

| JP | 2003-51279 | 2/2003 |
| JP | 2003-68239 | 3/2003 |
| JP | 2005-69375 | 3/2005 |
| JP | 2009-283421 | 12/2009 |

* cited by examiner

ROTATING ANODE X-RAY TUBE

CROSS-REFERENCE TO RELATED APPLICATIONS

This application is based upon and claims the benefit of priority from Japanese Patent Application No. 2013-042010, filed Mar. 4, 2013, the entire contents of which are incorporated herein by reference.

FIELD

Embodiments described herein relate generally to a rotating anode X-ray tube.

BACKGROUND

In general, as an X-ray tube assembly, a rotating anode X-ray tube assembly is used. The rotating anode X-ray tube assembly comprises a rotating anode X-ray tube configured to radiate an X-ray beam, a stator coil, and a housing accommodating the rotating anode X-ray tube and the stator coil. The rotating anode X-ray tube comprises an anode target, a cathode and a vacuum envelope, and uses a dynamic pressure type sliding bearing.

The sliding bearing includes a cylindrical rotor, a fixed shaft engaged with an internal part of the rotor and supporting the rotor in such a way as to allow the rotor to be rotated, and liquid metal filled in a space between the rotor and the fixed shaft. For example, the fixed shaft includes a first bearing surface and a second bearing surface which have respective spiral grooves formed therein. The rotor includes a third bearing surface. The first to third bearing surfaces are radial sliding bearing surfaces. The first bearing surface, the third bearing surface and the liquid metal form a first bearing (radial sliding bearing). The second bearing surface, the third bearing surface and the liquid metal form a second bearing (radial sliding bearing).

In an operating state of the rotating anode X-ray tube assembly, the stator coil generates a magnetic field to be applied to the rotor, and thus the rotor and the anode target are rotated. Furthermore, the cathode radiates an electron beam to the anode target. Therefore, the anode target radiates an X-ray beam when colliding against electrons. Of kinetic energy of electrons colliding against the anode target, slight kinetic energy is converted into an X-ray beam, and most kinetic energy is converted into heat.

The anode target is connected to the rotor, with a supporting member interposed between them. This structure can reduce the amount of heat to be transmitted from the anode target to the rotor, as compared with the case where no supporting member is used.

DETAILED DESCRIPTION

In general, according to one embodiment, there is provided a rotating anode X-ray tube which comprises: a fixed shaft comprising a small-diameter portion and a large-diameter portion, the small-diameter portion being cylindrically formed and including a first radial bearing surface including first grooved surfaces, the large-diameter portion being cylindrically formed to have a larger outer diameter than an outer diameter of the small-diameter portion, provided coaxially with the small-diameter portion, and including a second radial bearing surface including second grooved surfaces; a rotor cylindrically formed to extend coaxially with the fixed shaft, and comprising a third radial bearing surface which surrounds an outer periphery of the fixed shaft, and is located opposite to the first radial bearing surface and the second radial bearing surface; a lubricant filled in a gap between the fixed shaft and the rotor and to be drawn by the first and second grooved surfaces; a target provided closer to the large-diameter portion than to the small-diameter portion along an axis of the fixed shaft; and a supporting member joined to the target and part of the rotor which is located opposite to the small-diameter portion.

Figure 1:
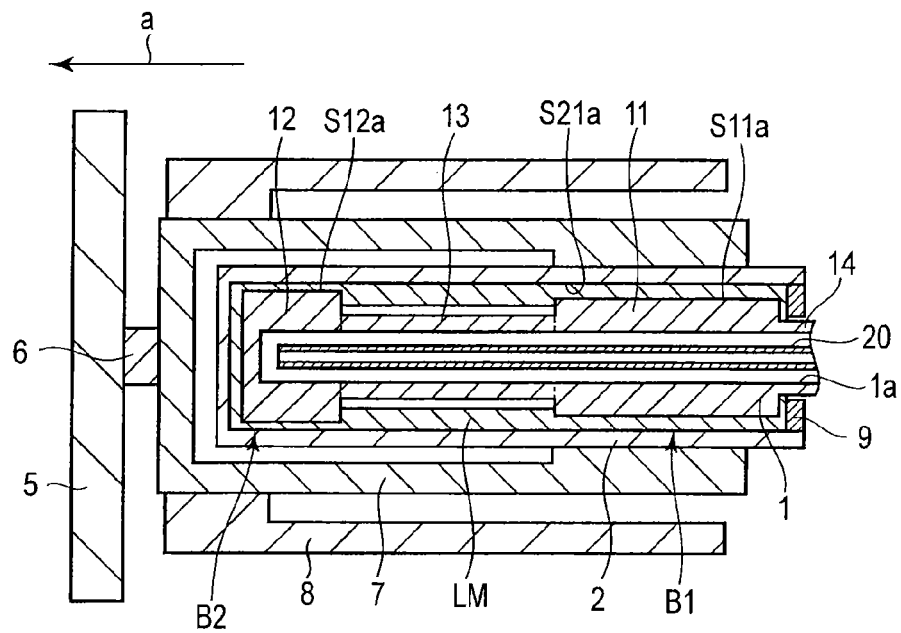
FIG. 1 is a cross-sectional view of part of a rotating anode X-ray tube of an embodiment.

A rotating anode X-ray tube according to an embodiment will be explained in detail with reference to the accompanying drawings. FIG. 1 is a cross-sectional view of part of the rotating anode X-ray tube of the embodiment.

As shown in FIG. 1, the rotating anode X-ray tube comprises a fixed shaft 1, a rotor 2, a liquid metal LM serving as a lubricant, a target (anode target) 5, a first supporting member 6, a second supporting member 7, a motor rotor 8, and a sealing member 9. The rotating anode X-ray tube uses sliding bearings. Also, although it is not shown, the rotating anode X-ray tube further comprises a cathode and a vacuum envelope which accommodates the fixed shaft 1, the rotor 2, the target 5, a supporting member (the first and second supporting members 6 and 7), the motor rotor 8, the sealing member 9 and the cathode.

The rotating anode X-ray tube is applied along with a stator coil (rotation driver), a housing, and an insulating coil (coolant), not shown, to a rotating anode X-ray tube assembly. The stator coil is located opposite to the motor rotor 8 and in such a way as to surround an outer periphery of the vacuum envelope. Also, when being supplied with a predetermined current, the stator coil generates a magnetic field to rotate a rotation unit. The rotation unit is comprised of the rotor 2, the target 5, the supporting member, the motor rotor 8 and the sealing member 9. The housing accommodates the rotating anode X-ray tube and the stator coil. The insulating oil is filled in a space between the housing and the rotating anode X-ray tube.

The fixed shaft 1 is cylindrically formed, and extends along an axis of the rotating anode X-ray tube. The fixed shaft 1 comprises a small-diameter portion 11, a large-diameter portion 12, a first connection member 13, and a second connection member 14. The small-diameter portion 11, the large-diameter portion 12, the first connection member 13 and the second connection member 14 are coaxially provided and formed integral with each other. The fixed shaft 1 is formed of iron-based metal such as iron (Fe) or an iron alloy.

The rotor 2 is supported by a sliding bearing, which will be described later, in such a way to be rotatable about the fixed shaft 1. The rotor 2 is cylindrically formed such that one end portion thereof is closed. It also extends coaxially with the fixed shaft 1 and surrounds an outer periphery of the fixed shaft 1. The rotor 2 and the fixed shaft 1 are located opposite to each other, with a gap (clearance) provided between the rotor 2 and the fixed shaft 1. The rotor 2 is formed of iron-based metal.

The liquid metal LM is filled in the space between the rotor 2 and the fixed shaft 1. In the embodiment, the liquid metal LM is a gallium-indium-tin alloy (GaInSn).

The sealing member 9 is provided at the other end portion of the rotor 2, i.e., an open end portion thereof. To be more specific, the sealing member 9 is fixed to the other end portion of the rotor 2. Also, the sealing member 9 is annularly formed and provided along an entire outer peripheral surface of the fixed shaft 1, with a gap provided between the sealing member 9 and the outer peripheral surface of the fixed shaft 1. The sealing member 9 restricts relative displacement of the fixed shaft 1 which is parallel to the axis of the rotating anode X-ray tube, along an axis a of the fixed shaft 1.

The gap (clearance) between the sealing member 9 and the fixed shaft 1 is set to a value to maintain rotation of the rotor 2 and also prevent leakage of the liquid metal LM. For the above reason, the gap is slight. Thus, the sealing member 9 functions as a labyrinth seal ring. Furthermore, in the axis a, the rotor 2, the fixed shaft 1, the sealing member 9 and the liquid metal LM forms a thrust sliding bearing.

The target 5 is joined to the rotor 2 by the supporting member, and can be rotated along with the rotor 2. The target 5 is located closer to the large-diameter portion 12 than to the small-diameter portion 11. In the embodiment, the target 5 is located opposite to the fixed shaft 1 and the rotor 2 along the axis a. The target 5 emits an X-ray beam due to collision of electrons emitted from an electron emission source (cathode). The target 5 is disciform, and formed of heavy metal or the like, such as molybdenum or a molybdenum alloy. Although it is not shown, the target 5 includes a target layer against which electrons collide. Also, the target layer is formed of metal such as molybdenum, a molybdenum alloy or a tungsten alloy. The target 5 is provided coaxially with the fixed shaft 1 and the rotor 2.

The supporting member includes the first supporting member 6 and the second supporting member 7. The supporting member is joined to the target 5 and part of the rotor 2 which is located opposite to the small-diameter portion 11. The first supporting member 6 is joined to the target 5. In the embodiment, the first supporting member 6 is cylindrically formed, and provided coaxially with the fixed shaft 1, etc. In the axis a, the first supporting member 6 is located between the target 5 and the rotor 2.

The second supporting member 7 is located outward of the rotor 2, and joined to the first supporting member 6 and the part of the rotor 2 which is located opposite to the small-diameter portion 11. In the embodiment, the second supporting member 7 is cylindrically formed, and provided coaxially with the fixed shaft 1, etc.

In a region between the target 5 and the rotor 2, the second supporting member 7 is formed in such a way as to project toward the first supporting member 6, and joined to the first supporting member 6. In the embodiment, one end portion of the second supporting member 7 is located in the region between the target 5 and the rotor 2, formed to be closed, and joined to the first supporting member 6.

The other end portion of the second supporting member 7 is formed to project toward the rotor 2 (in a direction perpendicular to the axis a), and jointed to the part of the rotor 2 which is located opposite to the small-diameter portion 11. In the embodiment, the other end portion of the second supporting member 7 is joined to an entire outer periphery of the above part of the rotor 2. The second supporting member 7 is located apart from an entire outer periphery of another part of the rotor 2, except for the other end portion of the second supporting member 7.

The motor rotor 8 is located outward of the second supporting member 7, cylindrically formed, and provided coaxially with the fixed shaft 1, etc. One end portion of the motor rotor 8 is formed in such a way as to project toward the second supporting member (in the direction perpendicular to the axis a), and joined to one end portion of the second supporting member 7. The motor rotor (rotor rotation torque generation portion) 8 is formed of, e.g., copper.

The first supporting member 6 is formed of molybdenum or a molybdenum alloy, and the second supporting member 7 is formed of a nickel alloy.

The above joining between the rotor 2, the target 5, the first supporting member 6, the second supporting member 7 and the motor rotor 8 is achieved by, e.g., brazing.

Figure 2:
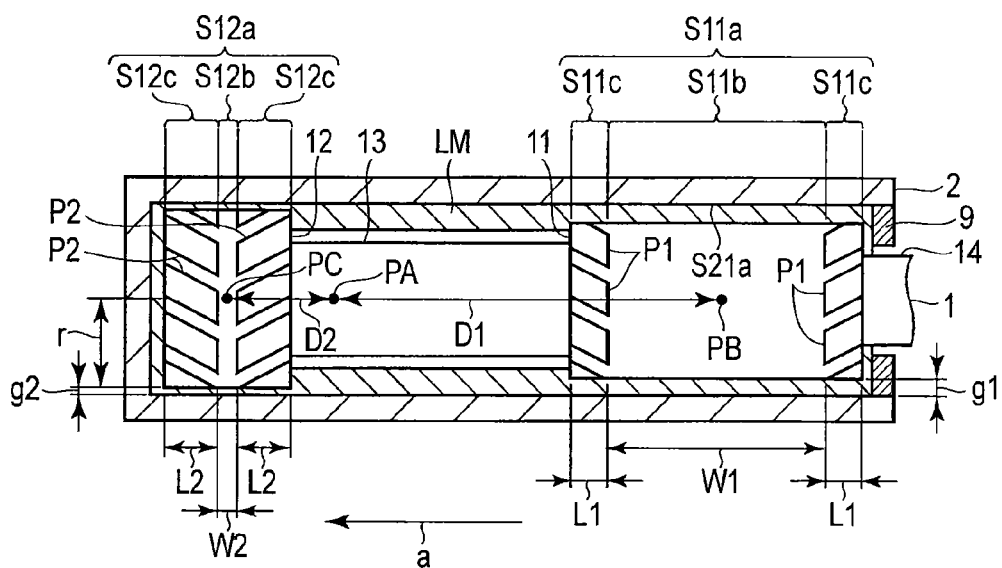
FIG. 2 is a diagrammatic view enlargedly showing a fixed shaft, a rotor and a liquid metal as shown in FIG. 1.

Next, the above fixed shaft 1 and the rotor 2 will be explained in detail. FIG. 2 is a diagrammatic view enlargedly showing the liquid metal, the rotor and the fixed shaft as shown in FIG. 1. In FIG. 2, the fixed shaft is shown as a front view, and the rotor is as a cross-sectional view.

As shown in FIGS. 1 and 2, the small-diameter portion 11 is cylindrically formed. The small-diameter portion 11 includes a first radial bearing surface S11a and a first thrust bearing surface. The first radial bearing surface S11a is formed as an entire outer peripheral surface of the small-diameter portion 11. The first thrust bearing surface is formed at one side surface of the second connection member 14.

The first radial bearing surface S11a includes a first plane surface S11b and first grooved surfaces S11c. The first plane surface S11b is a smooth outer peripheral surface and also adjacent to the first grooved surfaces S11c along the axis a.

The first grooved surfaces S11c are located on both sides of the first plane surface S11b along the axis a, and are uneven surfaces in each of which a plurality of first patterned portions P1 are formed along the above smooth outer peripheral surface. To be more specific, the first patterned portions P1 are arranged along the entire smooth outer peripheral surface, and recessed with respect to the smooth outer peripheral surface. Also, the first patterned portions P1 extend obliquely with respect to a rotation direction of the rotor 2, and are also formed to have grooves having a depth of several tens of micrometers. The first patterned portions P1 of the first grooved surfaces S11c form a herringbone pattern. By virtue of this structure, when the rotor 2 is rotated, the first patterned portions P1 can draw the liquid metal LM, and cause a dynamic pressure to be easily generated by the liquid metal LM.

The large-diameter portion 12 is cylindrically formed to be larger in outer diameter than the small-diameter portion 11. The large-diameter portion 12 includes a second radial bearing surface S12a and a second thrust bearing surface. The second radial bearing surface S12a is formed as an entire outer peripheral surface of the large-diameter portion 12. The second thrust bearing surface is formed opposite to one end portion (closed end portion) of the rotor 2.

The second radial bearing surface S12a includes a second plane surface S12b and second grooved surfaces S12c. The second plane surface S12b is a smooth outer peripheral surface and also located adjacent to the second grooved surfaces S12c along the axis a.

The second grooved surfaces S12c are located on both sides of the second plane surface S12b along the axis a, and are uneven surfaces in each of which a plurality of second patterned portions P2 are formed along the above smooth outer peripheral surface. To be more specific, the second patterned portions P2 are arranged along the entire smooth outer peripheral surface, and recessed with respect to the smooth outer peripheral surface. Also, the second patterned portions P2 extend obliquely with respect to the rotation direction of the rotor 2, and are also formed to have grooves having a depth of several tens of micrometers. The second patterned portions P2 of the second grooved surfaces S12c form a herringbone pattern. By virtue of this structure, when the rotor 2 is rotated, the second patterned portions P2 can draw the liquid metal LM, and cause a dynamic pressure to be easily generated by the liquid metal LM.

An internal diameter of the rotor 2 is slightly larger than a diameter of the large-diameter portion 12. The rotor 2 includes a third radial bearing surface S21a as its outer peripheral surface, which is located opposite to the first radial bearing surface S11a and the second radial bearing surface S12a.

The first radial bearing surface S11a, the third radial bearing surface S21a and liquid metal LM existing between those surfaces forms a first radial sliding bearing B1. The second radial bearing surface S12a, the third radial bearing surface S21a and liquid metal LM existing between those surfaces form a second radial sliding bearing B2.

The first connection member 13 is cylindrically formed to be smaller in outer diameter than the small-diameter portion 11, and also located between the small-diameter portion 11 and the large-diameter portion 12 along the axis a. Due to provision of the first connection member 13, the fixed shaft 1 can be formed to have a recessed portion, which is in the shape of a circular frame and also serve as a reservoir for the liquid metal LM. The second connection member 14 is cylindrically formed to be smaller in outer diameter than the small-diameter portion 11, and located opposite to the first connection member 13 with respect to the small-diameter portion 11 along the axis a. The second connection member 14 extends outwardly from the rotor 2.

The fixed shaft 1 includes a hole 1a extending along the axis a. The hole 1a is open at the second connection member 14, and penetrates the second connection member 14, the small-diameter portion 11 and the first connection member 13 to extend to an internal part of the large-diameter portion 12.

In the hole 1a, a tube 20 is provided. The tube 20 and the hole 1a form a flow pass for a cooling fluid. One end portion of the tube 20 extends outwardly from the fixed shaft 1 through an opening of the hole 1a.

By virtue of the above structure, space for circulating the cooling fluid can be provided in the fixed shaft 1. A direction in which the cooling fluid is circulated is not particularly limited. Thus, an opening of the tube 20, which is located outward of the fixed shaft 1, serves as a drawing port for drawing the cooling fluid from the hole 1a or a discharge port for discharging the cooling fluid to the hole 1a. As the cooling fluid, a water-based coolant or an insulating oil can be used. Thereby, heat transmitted to the fixed shaft 1 is propagated to the cooling fluid, and is radiated to the outside of the rotating anode X-ray tube.

Next, the radial sliding bearing according to the embodiment will be explained.

As a matter of convenience for explanation, a center of gravity of the rotation unit (the rotor 2, the target 5, the supporting member, the motor rotor 8 and the sealing member 9) will hereinafter be denoted by PA; likewise, a center of the first radial bearing surface S11a will be PB; likewise, a center of the second radial bearing surface S12a will be PC; likewise, a distance from the center of gravity PA to the center PB along the axis a is D1; and likewise, a distance from the center of gravity PA to the center PC along the axis a is D2; and a radius of the large-diameter portion 12 is r.

Also, a gap between the first radial bearing surface S11a and the third radial bearing surface S21a will hereinafter be denoted by g1; likewise, a length of the first plane surface S11b along the axis a will be W1; likewise, a length of each of the first grooved surfaces S11c along the axis a will be L1; likewise, an area of the first radial bearing surface S11a will b S1; likewise, an area of each of the first grooved surfaces 11C will be S1a; and likewise, an area of the first plane surface S11b (an area of part of the first radial bearing surface S11a, which excludes the first grooved surfaces S11c) will be S1b.

Also, a gap between the second radial bearing surface S12a and the third radial bearing surface S21a will hereinafter be denoted by g2; likewise, a length of the second plane surface S12b along the axis a will be W2; likewise, a length of each of the second grooved surfaces S12c along the axis a will be L2; likewise, an area of the second radial bearing surface S12a will be S2; likewise, an area of each of the second grooved surfaces S12c will be S2a; and likewise, an area of the second plane surface S12b (an area of part of the second radial bearing surface S12a, which excludes the second grooved surfaces S12c) will be S2b. It should be noted that the second radial bearing surface S12a can be provided to satisfy the equation "W2=0" (the second radial bearing surface S12a can be made of a single second grooved surface S12c only).

In general, a temperature of the target 5 rises to a high temperature of 1000° C. or higher by collision of electrons. Heat generated at the target 5 is dissipated by radiation from a surface of the target 5. Also, heat generated at the target 5 is transmitted to the fixed shaft 1 (the first radial bearing surface S11a) through the first supporting member 6, the second supporting member 7, the third radial bearing surface S21a (the rotor 2) and the liquid metal LM existing in the gap g1.

However, in the embodiment, a heat transmission path from the target 5 to the rotor 2 can be elongated by providing the first supporting member 6 and the second supporting member 7. Also, the second supporting member 7 can be formed of material having a low heat transmission rate (e.g. a nickel alloy), and thereby the quantity of heat transmitted from the target 5 to the rotor 2 can be further reduced. For example, a temperature of one end portion of the second supporting member 7 (which is part joined to the first supporting ember 6) is approximately 800° C., and that of the other end portion of the second supporting member 7 (which is part joined to the rotor 2) is approximately 300° C.

Although the temperature of the other end portion of the second supporting member 7 is lower than that of the above one end portion thereof, it is high, and there is a possibility that it will adversely affect the bearings. The smaller the area of each of the bearing surfaces, the higher the temperature thereof. If the temperature of each bearing surface rises, reaction between material forming each bearing surface and the liquid metal is promoted, and the gap g1 is filled with reactant in a short time period, as a result of which the bearings do not function.

Occurrence of the above problem can be avoided by setting the length (W1+2L1) of the first radial bearing surface S11a such that it is larger than the length (W2+2L2) of the second radial bearing surface S12a, i.e., making the area S1 larger than the area S2. This is because the above setting can prevent the temperature of each bearing surface from reaching a temperature at which each bearing surface and the liquid metal react with each other in a short time period.

Furthermore, in order to minimize losses of the bearings which increase as the areas of the bearings increase, supposing the gaps g1 and g2 are equal to each other, in general, a fixed shaft is designed to satisfy the following formula (1):

$$D1 \times S1 = D2 \times S2 \quad (1)$$

However, in order to restrict lowering of a function of the first radial sliding bearing B1 due to rising of the temperatures of the bearing surfaces, the area S1 is made larger than the area S2, and in the embodiment, which prevents the temperature of the bearing surface of the bearing B1 from being risen, the fixed shaft 1 is formed to satisfy the following formula (2):

$$D2 \times S2 < D1 \times S1 \quad (2)$$

Although the degree to which the temperature of the bearing surface of the bearing B1 is risen varies in accordance with the material of the bearing and a rate at which the fixed shaft 1 is cooled by the cooling fluid circulating in the hole 1a, it is preferable that the fixed shaft 1 be formed to satisfy in the main the following formula (3):

$$1.2 \times D2 \times S2 < D1 \times S1 \quad (3)$$

As can be seen from the above formula (3), it is preferable that the fixed shaft 1 be formed such that "D1×S1" is larger than "D2×S2" by 20% of "D2×S2" or more. The fixed shaft 1 can be formed without according with the above general design of bearings. Therefore, the fixed shaft 1 and the rotor 2 can be formed of iron-based metal which is not expensive and has a high speed of reaction with the liquid metal LM, not a molybdenum (Mo) alloy, etc. which are expensive and have a low speed of reaction with the liquid metal LM. This can restrict lowering of the functions of the bearings, and reduce a manufacturing cost.

It should be noted that the difference between the outer diameters of the small-diameter portion 11 and the large-diameter portion 12 is slight. Thus, the above advantage can be obtained even if the above formulas (1)-(3) are replaced with the formulas "D1×(W1+2L1)=D2×(W2+2L2)", "D2×(W2+2L2)<D1×(W1+2L1)" and "1.2×D2×(W2+2L2)<D1×(W1+2L1)", respectively.

However, in the case where the area of the first radial bearing surface S11a is simply increased, the following two problems arise:

Firstly, the upper limit of the number of revolutions of the rotor 2 is limited. To be more specific, if the area of the first radial bearing surface S11a is simply increased, the loss of the bearing is increased due to a viscosity resistance of the liquid metal LM. Also, if the number of revolutions of the rotor 2 is large, and a load function of the first radial sliding bearing B1 is higher than necessary, the rotor 2 shakes at the second radial sliding bearing B2, which has a low load function, due to a remaining subtle imbalance of the rotor 2. A rotation operation of the rotor 2 becomes unstable, and for example, the rotor 2 vibrates. In this case, the upper limit of the number of revolutions of the rotor 2 is limited to stabilize the rotating operation of the rotor 2.

Secondly, the bearing surfaces are damaged, thus lowering the functions of the bearings. Especially, the function of the second radial sliding bearing B2 is further lowered, and the second radial bearing surface S12a and the third radial bearing surface S21a are damaged. This is because when rotation of the rotor 2 is stopped, at the first sliding bearing B1, the load of the rotation unit can be scattered over a wide area, and thus the first sliding bearing B1 falls into a boundary lubrication range after the number of revolutions of the rotor 2 becomes small, whereas at the second radial sliding bearing B2, the load of the rotation unit concentrates on a narrow area, and thus the second radial sliding bearing B2 falls into the boundary lubrication range, with the number of revolutions of the rotor 2 kept large. It should be noted that when the radial sliding bearing falls into the boundary lubrication range, it means that the gap between the bearing surfaces runs out of liquid metal LM, and the fixed shaft 1 and the rotor 2 start to come into contact with each other.

Thus, the rotor 2 is inclined relative to the fixed shaft 1, and at the second radial sliding bearing B2, the rotor 2 starts to come into contact with the fixed shaft 1 while partially hitting on the fixed shaft 1, and then completely contacts the fixed shaft 1. Consequently, the rotor 2 is stopped. Each time the rotor 2 is started (its rotation is started) and stopped (its rotation is stopped), the rotor 2 partially hits on the bearing surfaces, especially, the second radial bearing surface S12a and the third radial bearing surface S21a, and thus these bearing surfaces are damaged and scored from their damages, thus lowering the functions of the bearings.

In view of the above, in the embodiment, in order to solve the above problems, the gaps g1 and g2 and the lengths W1, W2, L1 and L2 are adjusted. First, it will be explained how to prevent the load function of the first radial sliding bearing B1 from being higher than necessary due to increasing of the area S1, and restrict increasing of a rotation loss (friction loss) of the first radial sliding bearing B1 due to increasing of the area S1.

The above rotation loss is proportional to the area S1, and inversely proportional to the gap g1. To be more specific, if the area S1 is increased, the rotation loss is also increased, and if the gap g1 is increased, the rotation loss is decreased. Thus, in the embodiment, since the area S1 is increased, the outer diameter of the small-diameter portion 11 is set to be smaller than that of the large-diameter portion 12, and the gap g1 is set to be larger than that of the gap g2 (g2<g1). For example, the gap g1 is set to be larger than the gap g2 by 3 to 20 μm. By virtue of this feature, the rotation loss of the first radial sliding bearing B1 can be reduced. It is preferable that the outer diameter of the small-diameter portion 11 is smaller than that of the large-diameter portion 12 by ⅓×r× 1/1000 to r×1/1000. If they are set in such a manner, the above advantage can be obtained.

In addition, during a regular operation of the rotor 2, an amount of deflection of part of the rotor 2 which is located at the first radial sliding bearing B1 becomes equivalent to that of part of the rotor 2 which is located at the second radial sliding bearing B2. Thus, it is possible to prevent vibrating and shaking of the rotor 2 which would occur if the amounts of deflection of the above parts are unbalanced, thus stabilizing the rotating operation of the rotor 2.

Next, it will be explained how to prevent the rotating operation of the rotor 2 from becoming unstable (prevent the rotor 2 from shaking and vibrating) due to a difference between the load function of the first radial sliding bearing B1 and that of the second radial sliding bearing B2, and also prevent times at which they completely contact the fixed shaft 1 from differing from each other.

It should be noted that as a matter of convenience for explanation, a bearing spring constant obtained by subtracting the gap g1 from the load of the first radial sliding bearing B1 will hereinafter be referred to as a first spring constant, and likewise, a bearing spring constant obtained by subtracting the gap g2 from the second radial sliding bearing B2 will be as a second spring constant.

From a ratio between the areas S1 and S2, the first spring constant is larger than the second spring constant. In view of this point, in the embodiment, the lengths W1, W2, L1 and L2 and the areas S1a, S1b, S2a and S2b are adjusted so that the first spring constant is set small, and the second spring constant is set large.

In the case of designing an ordinary sliding bearing, a fixed shaft 1 is formed to satisfy the formulas "W1/L1=W2/L2=1/1" and "S1b/S1a=S2b/S2a=½". On the other hand, in the embodiment, the fixed shaft 1 is formed to satisfy the following formulas (4) and (5):

$$\tfrac{1}{2} < S1b/S1a \quad (4)$$

$$S2b/S2a < \tfrac{1}{2} \quad (5)$$

Thereby, the first and second spring constants can be made equivalent to each other to be commensurate with the loads.

Furthermore, it is preferable that the fixed shaft 1 be formed to satisfy the following formulas (6) and (7):

$$\tfrac{1}{2} < S1b/S1a \leq 5/1 \quad (6)$$

$$0/1 \leq S2b/S2a < \tfrac{1}{2} \quad (7)$$

In the first radial sliding bearing B1, the area S1a is set smaller than the area S1b to satisfy the formula "1<W1/L1≤10". In such a manner, when the area S1a (the first grooved surface S11c) is set small, a force thereof for drawing the liquid metal LM into space located opposite to the first radial bearing surface S11a can be reduced, as a result of which the first spring constant can be made small.

In the second radial sliding bearing B2, the area S2a is set larger than the area S2b to satisfy the formula "0≤W2/L2<1". In such a manner, when the area S2a (the second grooved surface S12c) is set large, a force thereof for drawing the liquid metal LM into space located opposite to the second radial bearing surface S12a can be increased, as a result of which the second spring constant can be made large. There can be a case where the second radial bearing surface S12a has the second grooved surface S12c only (W2=0).

As described above, in the case where the area S1 of the first radial bearing surface S11a is increased for thermal diffusion, it is possible to prevent the load functions of the bearings from being increased higher than necessary and also prevent lowering of their bearing functions, by adjusting the ratio between the gaps g1 and g2, the ratios among the lengths W1, W2, L1 and L2, the ratio among the areas S1a, S1b, S2a and S2b.

The rotating anode X-ray tube formed in such a manner as described above comprises the fixed shaft 1, the rotor 2, the liquid metal LM, the target 5, and the supporting member (the first supporting member 6 and the second supporting member 7). The fixed shaft 1 comprises the small-diameter portion 11 which is provided with the first radial bearing surface S11a including the first grooved surfaces S11c, and the large-diameter portion 12 which is provided with the second radial bearing surface S12a including the second grooved surfaces S12c and which is larger in outer diameter than the small-diameter portion 11. The rotor 2 includes the third radial bearing surface S21a.

The liquid metal LM is filled in the gap between the fixed shaft 1 and the rotor 2. Also, the liquid metal LM, the fixed shaft 1, the rotor 2 and the sealing member 9 form the first radial sliding bearing B1, the second radial sliding bearing B2 and the thrust sliding bearing. The target 5 is located closer to the large-diameter portion 12 than to the small-diameter portion 11 along the axis a. The supporting member is joined to the target 5 and part of the rotor 2 which is located opposite to the small-diameter portion 11.

Since the small-diameter portion 11 has a smaller outer diameter than the outer diameter of the large-diameter portion 12 (g2<g1), it can reduce the rotation loss of the first radial sliding bearing B1. Furthermore, as the rotation loss is reduced, the area S1 of the first radial bearing surface S11a can be enlarged.

Thus, even in the case where the first radial sliding bearing B1 forms a main heat transmission path from the rotor 2 (the target 5) to the fixed shaft 1, heat is diffused at the first radial bearing surface S11a having the enlarged area S1. It is therefore possible to prevent the temperatures of the bearing surfaces (the first radial bearing surface S11a and the third radial bearing surface S21a) and the liquid metal LM from reaching a temperature at which the bearing surfaces and the liquid metal LM reach with each other in a short time period, and also prevent lowering of the bearing function.

Furthermore, in the case where the area S1 can be enlarged as described above, the fixed shaft 1 and the rotor 2 can be formed of ion-based metal which is not expensive, not molybdenum which is expensive. Thus, the manufacturing cost of the rotating anode X-ray tube can be reduced.

In addition, as described, since the small-diameter portion 11 is smaller in outer diameter than the large-diameter portion 12, and the area S1 is enlarged, the first spring constant of the first radial sliding bearing B1 and the second spring constant of the second radial sliding bearing B2 can be balanced, and the rotating operation of the rotor 2 can be stabilized.

For the above reasons, it is possible to achieve a rotating anode X-ray tube which prevents the load functions of the bearings from being increased to be higher than necessary, and also prevents lowering of the bearing functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the fixed shaft 1 may include three or more radial bearing surfaces which are located opposite to the third radial bearing surface S21a. In this case also, by adjusting the designs of all radial sliding bearings as in the above embodiment, it is possible to prevent the load functions of the bearings from being increased to be higher than necessary, and also prevent lowering of the bearing functions.

The embodiment of the present invention is not limited to the above rotating anode X-ray tube, and can be applied to various kinds of rotating anode X-ray tubes.

What is claimed is:

1. A rotating anode X-ray tube comprising:
a fixed shaft comprising a small-diameter portion and a large-diameter portion; the small-diameter portion being cylindrical formed, and including a first radial bearing surface including a pair of first grooved surfaces and a first plane surface located between the first grooved surfaces; the large-diameter portion being cylindrically formed to be larger in outer diameter than the small-diameter portion, provided coaxially with the small-diameter portion, and including a second radial bearing surface including a pair of second grooved surfaces and a second plane surface located between the second grooved surfaces;

a rotor cylindrically formed to extend coaxially with the fixed shaft, and comprising a third radial bearing surface which surrounds an outer periphery of the fixed shaft, and is located opposite to the first radial bearing surface and the second radial bearing surface;

a lubricant filled in a gap between the fixed shaft and the rotor and to be drawn by the first and second grooved surfaces;

a target provided closer to the large-diameter portion than to the small-diameter portion along an axis of the fixed shaft; and a supporting member joined to the target and part of the rotor which is located opposite to the small-diameter portion, wherein an entire area of the first radial bearing surface is larger than an entire area of the second radial bearing surface, where g1 is a gap between the first radial bearing surface and the third radial bearing surface, and g2 is a gap between the second radial bearing surface and the third radial bearing surface, the formula "g1>g2" is satisfied, and where S1$a$ is an entire area of each of the first grooved surfaces, S1$b$ is an entire area of the first plane surface, S2$a$ is an entire area of each of the second grooved surfaces, and S2$b$ is an entire area of the second plane surface, the formulas "½<S1$b$/S1$a$" and "S2$b$/S2$a$<½" are satisfied.

2. The rotating anode X-ray tube of claim 1, wherein where r is a radius of the large-diameter portion, an outer diameter of the small-diameter portion is smaller than an outer diameter of the large-diameter portion by ⅓×r×1/1000 to r×1/1000.

3. The rotating anode X-ray tube of claim 1, wherein the formulas "½<S1$b$/S1$a$≤5/1" and "0/1≤S2$b$/S2$a$<½" are satisfied.

4. The rotating anode X-ray tube of claim 1, wherein the rotor, the target and the supporting member form a rotation unit, and where D1 is a distance from a center of gravity of the rotation unit to a center of the first radial bearing surface along the axis, S1 is the entire area of the first radial bearing surface, D2 is a distance from the center of gravity of the rotation unit to a center of the second radial bearing surface along the axis, and S2 is the entire area of the second radial bearing surface, the formula "D2×S2<D1×S1" is satisfied.

5. The rotating anode X-ray tube of claim 4, wherein the formula "1.2×D2×S2<D1×S1" is satisfied.

6. The rotating anode X-ray tube of claim 1, wherein:
the first plane surface is a smooth outer peripheral surface, and
the second plane surface is a smooth outer peripheral surface.

7. The rotating anode X-ray tube of claim 1, wherein:
each of the first grooved surfaces is an uneven surface in which a plurality of first patterned portions are formed along a smooth outer peripheral surface;
the first patterned portions are arranged along the smooth outer peripheral surface and recessed with respect to the outer peripheral surface;
each of the second grooved surfaces is an uneven surface in which a plurality of second patterned portions are formed along a smooth outer peripheral surface; and
the second patterned portions are arranged along the smooth outer peripheral surface and recessed with respect to the outer peripheral surface.

8. The rotating anode X-ray tube of claim 1, wherein the fixed shaft includes therein space for circulating a cooling fluid.

\* \* \* \* \*